United States Patent [19]

Richards et al.

[11] Patent Number: 4,986,305
[45] Date of Patent: Jan. 22, 1991

[54] FLUIDIC MULTIPLEXER

[75] Inventors: John C. Richards, Mason; Joseph P. Smith, Jr., Cincinnati, both of Ohio

[73] Assignee: General Electric Company, Cincinnati, Ohio

[21] Appl. No.: 156,688

[22] Filed: Feb. 17, 1988

[51] Int. Cl.$^5$ .............................................. F17D 3/00
[52] U.S. Cl. .......................... 137/625.15; 137/625.23
[58] Field of Search ............... 137/625.15, 625.16, 137/625.17, 625.23, 625.24; 251/58

[56] References Cited

U.S. PATENT DOCUMENTS

| 738,236 | 9/1903 | Prentice et al. | 251/58 |
| 1,546,579 | 7/1925 | Hammond, Jr. | |
| 2,221,462 | 11/1940 | Trambly | 137/625.17 |
| 2,490,509 | 2/1958 | Carleton | 137/625.24 |
| 2,834,376 | 5/1958 | Hughes | 137/625.16 |
| 2,980,138 | 4/1961 | Detweiler et al. | 137/624.13 |
| 3,021,869 | 2/1962 | Ross | 137/625.24 |
| 3,650,295 | 3/1972 | Smith | 137/625.24 |
| 3,774,634 | 11/1973 | Bonney | 137/625.23 |
| 4,177,713 | 12/1979 | Lewis et al. | 91/375 R |
| 4,199,007 | 4/1980 | Holmes | 137/625.17 |
| 4,235,156 | 11/1980 | Olsen | 91/363 R |
| 4,253,494 | 3/1981 | Cooke | 137/625.15 |
| 4,304,263 | 12/1981 | Choate | 137/624.15 |
| 4,422,475 | 12/1983 | Aspinwall | 137/630.15 |
| 4,794,847 | 1/1989 | Kreuter et al. | 251/58 |

Primary Examiner—Louis J. Casaregola
Attorney, Agent, or Firm—Jerome C. Squillaro

[57] ABSTRACT

The invention concerns a system for distributing fluid pressure to several fluidic motors from a common location. At the common location, a source pipe, which acts as the source of fluid pressure, travels past, and couples with, each pipe in a group of receiver pipes in sequence. Pressure in the source pipe is controlled so that the pressure is proper for each receiver pipe with which the source pipe couples. The receiver pipes connect with fluidic motors. Accordingly, a single control apparatus, located near the source pipe, is used and the pressure and flow from the source pipe is time-multiplexed and transmitted to the fluidic motors.

4 Claims, 6 Drawing Sheets

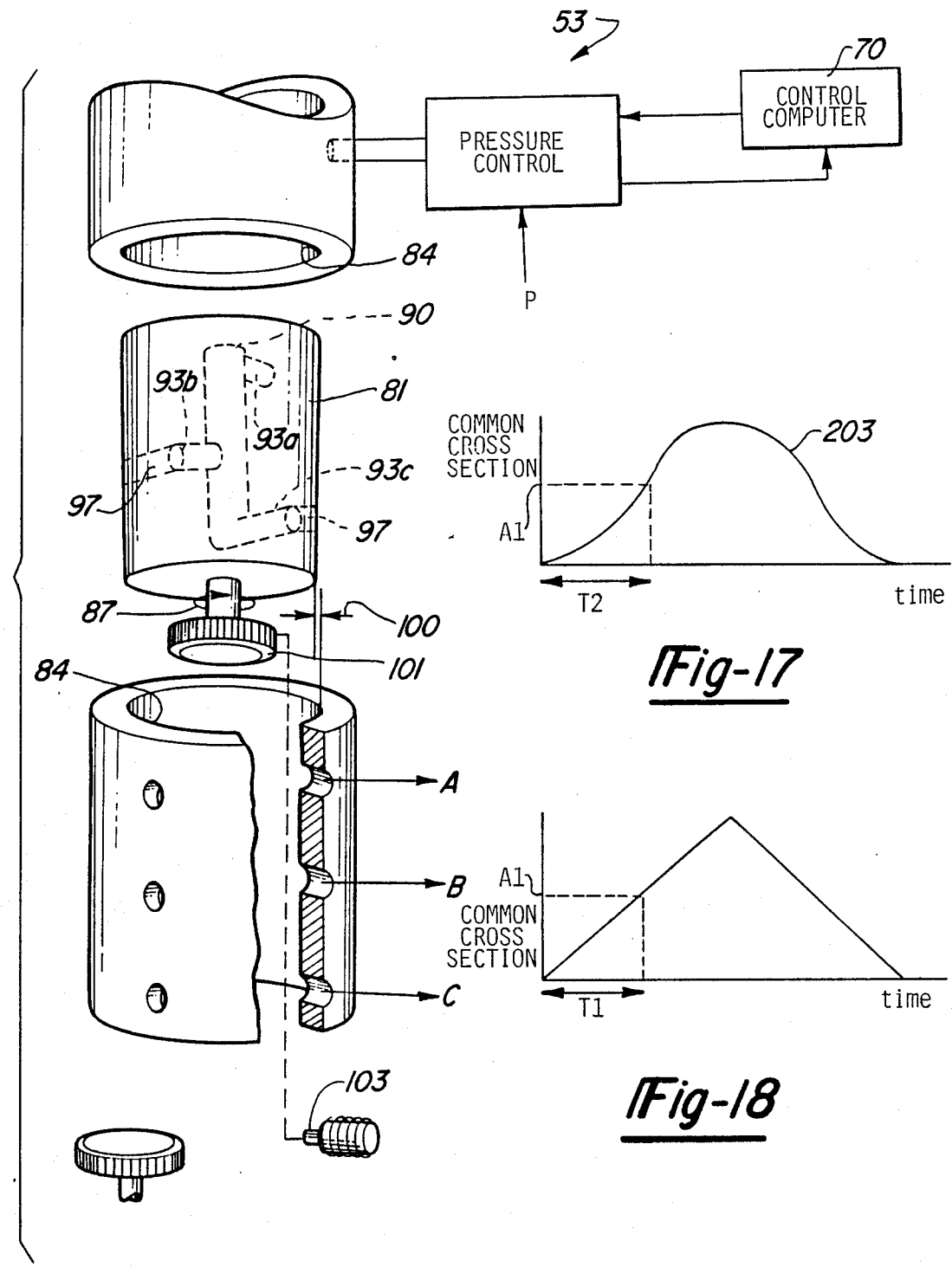

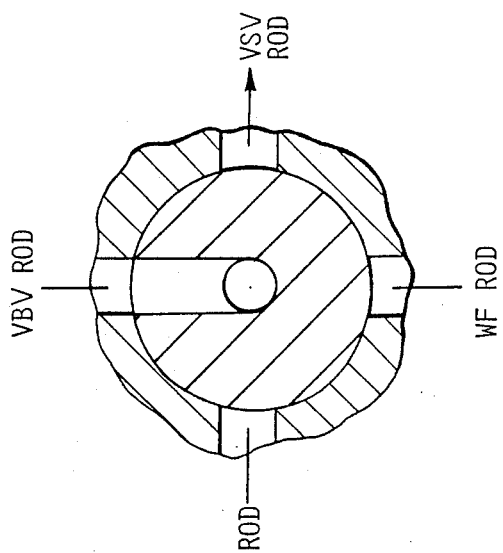
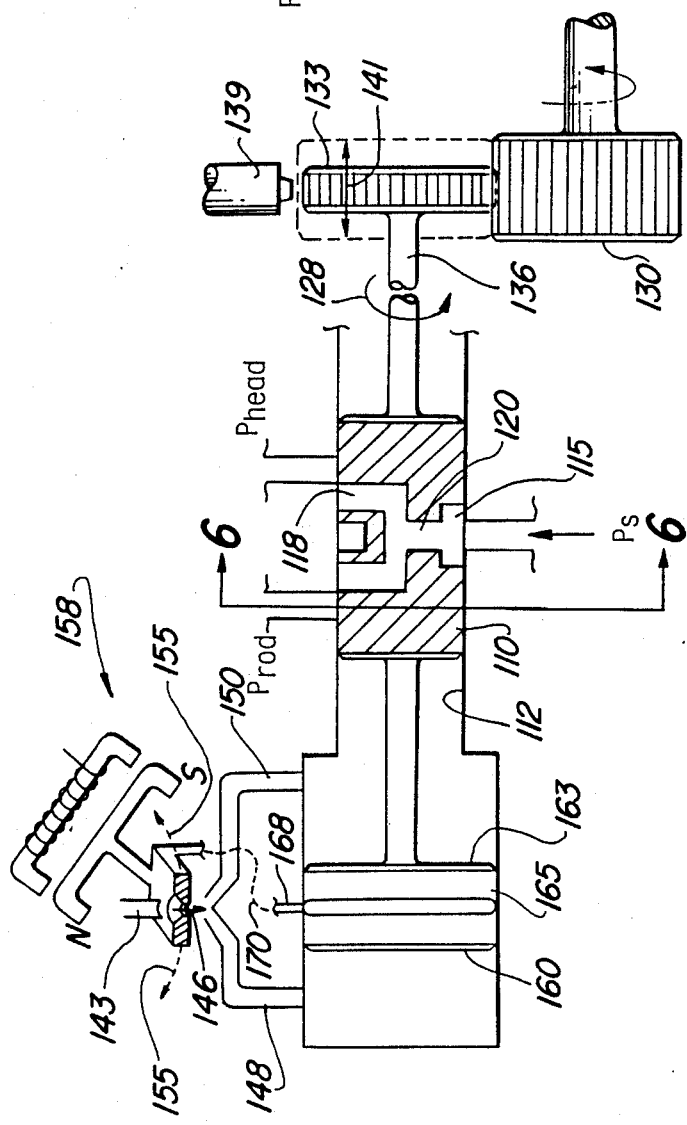
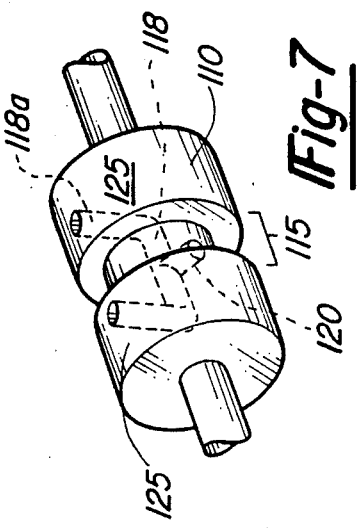

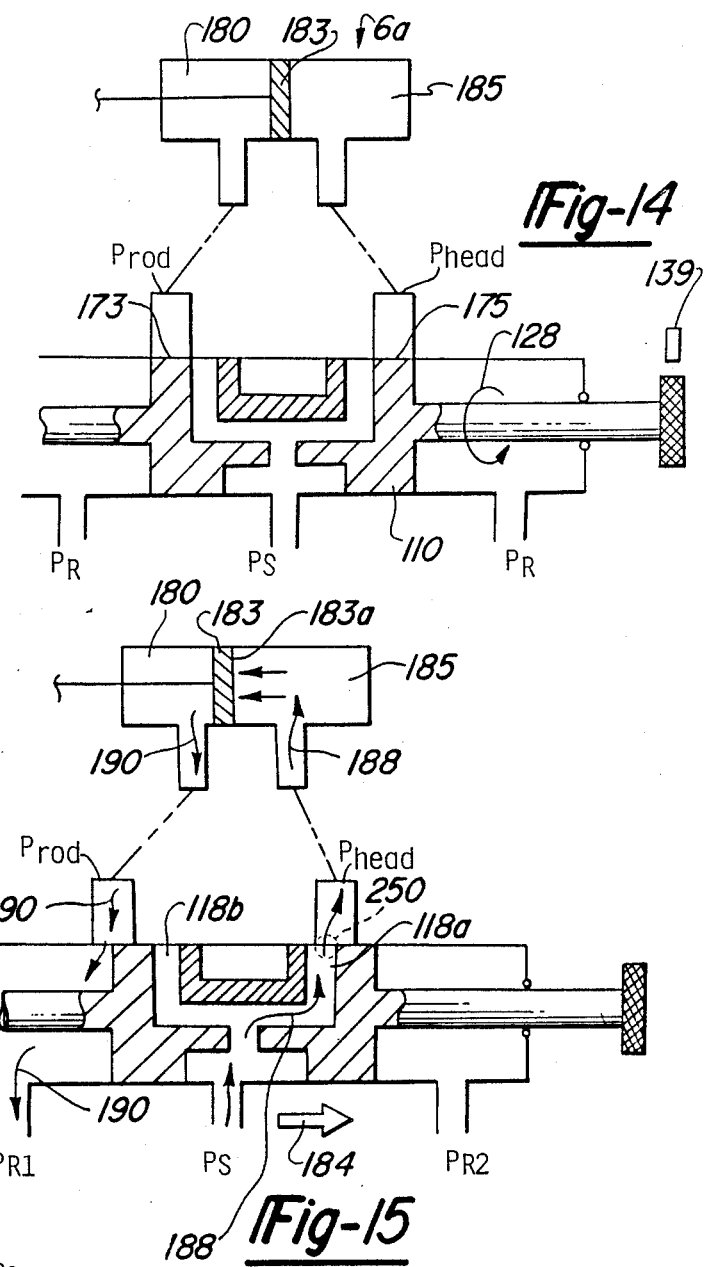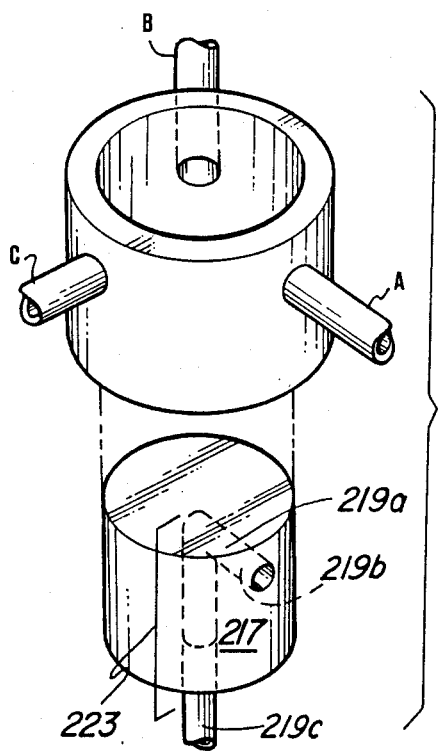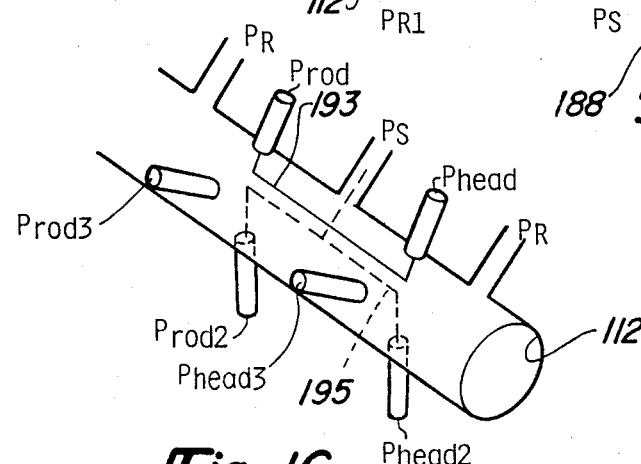

FLUIDIC MULTIPLEXER

The invention concerns a device which can supply a different fluid pressure and flow to each of several hydraulic lines from a common source and, further, which can rapidly change the pressure and flow in any selected line.

BACKGROUND OF THE INVENTION

FIG. 1 illustrates a gas turbine, engine 3. Several different hydraulic actuators, illustrated as pistons 6a–d, are used to operate components in the engine. For example, actuator 6a opens and closes a bleed door 9 which bleeds pressurized air 11 from booster stage 14. The booster 14 is a low-pressure compressor, and bleeding is sometimes necessary to match the output of the booster, at point 16, to the input requirements of the high-pressure compressor 18. Door 9 is commonly referred to as a variable by-pass valve (VBV).

A second actuator 6b operates variable stator vanes (VSV), which are shown in more detail in FIG. 2A. Varying the angle of the VSV's by rotation, indicated by circular arrow 21, allows one to control the direction of the airstream 24 which enters the compressor blades 27, thereby controlling the angle of attack of the compressor blades 27. VSV's are used to improve the performance of the compressor under acceleration.

A third actuator 6c in FIG. 1 controls a valve 30 which blows hot (or cold) air 33 upon turbine casing 36 in order to expand (or shrink) the casing 36 to thereby control the clearance 39 between turbine blades 41 and the casing 36. The air is commonly bled from the high-pressure compressor 18 as indicated. It is desirable to maintain as small a clearance 39 as possible in order to minimize leakage through the clearance. Leakage represents a loss because the leaking air imparts virtually no momentum to the turbine blades 41, and the energy in the leaking air is wasted.

A fourth actuator 6d in FIG. 1 controls a fuel valve 43 which controls the amount of fuel delivered to combustors 44.

Four types of actuators have been described, and other types are also in use in gas turbine aircraft engines. For example, there are actuators involved in the thrust reversing system, in exhaust nozzles which are variable in area, and in thrust vectoring systems used in vertical takeoff and landing (VTOL) aircraft. Further, it is foreseen that, as gas turbine technology advances, an even greater number of hydraulic actuators will come into use.

For each actuator 6a–d, a control is needed, which usually takes the form of a servovalve. The servovalve controls the flow rate and pressure of hydraulic fluid applied to the actuator, thus controlling the position of the actuator, thereby controlling, for example, the amount of fuel delivered by fuel valve 43 in FIG. 1. The use of an individual control for each actuator just described results in significant cost, weight, and mechanical complexity.

OBJECT OF THE INVENTION

It is an object of the present invention to provide a pressure distribution system to several hydraulic actuators, using a single distributor, or multiplexer.

SUMMARY OF THE INVENTION

In one form of the invention, a selected hydraulic pressure is applied to a chamber. Then, the chamber is connected to one of several hydraulic lines which leads to one of several hydraulic actuators. Following this, the connection is broken, the line is sealed, and a different pressure is applied to the chamber, which is then connected to a second line, and so on. The cycle occurs very rapidly, so that each line is connected to the chamber ten or more times per second.

BRIEF DESCRIPTION OF THE DRAWING

FIG. 4 illustrates one form of hydraulic piston used in the present invention.

FIGS. 3 and 5 illustrate other forms of the invention.

FIG. 6 illustrates a view of FIG. 5, taken along the lines 6—6.

FIG. 7 is a perspective view of spool 110 in FIG. 5.

FIG. 13 illustrates a modified plug valve.

FIGS. 14 and 15 illustrate the operation of the embodiment of FIG. 5.

FIG. 16 illustrates the configuration of cylinder 112 in FIG. 15.

FIGS. 17 and 18 illustrate the common cross section 201 in FIGS. 11A–C for circular outlets and rectangular outlets, respectively.

DETAILED DESCRIPTION OF THE INVENTION

Figure 2A:
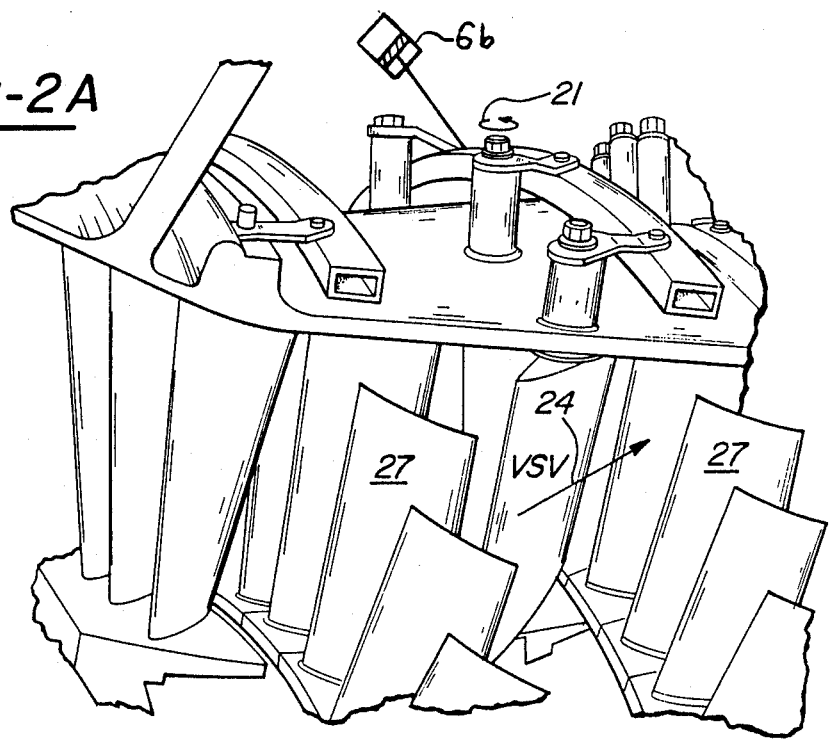
FIG. 2A illustrates variable stator vanes (VSV) in a gas turbine engine compressor.
Figure 2:
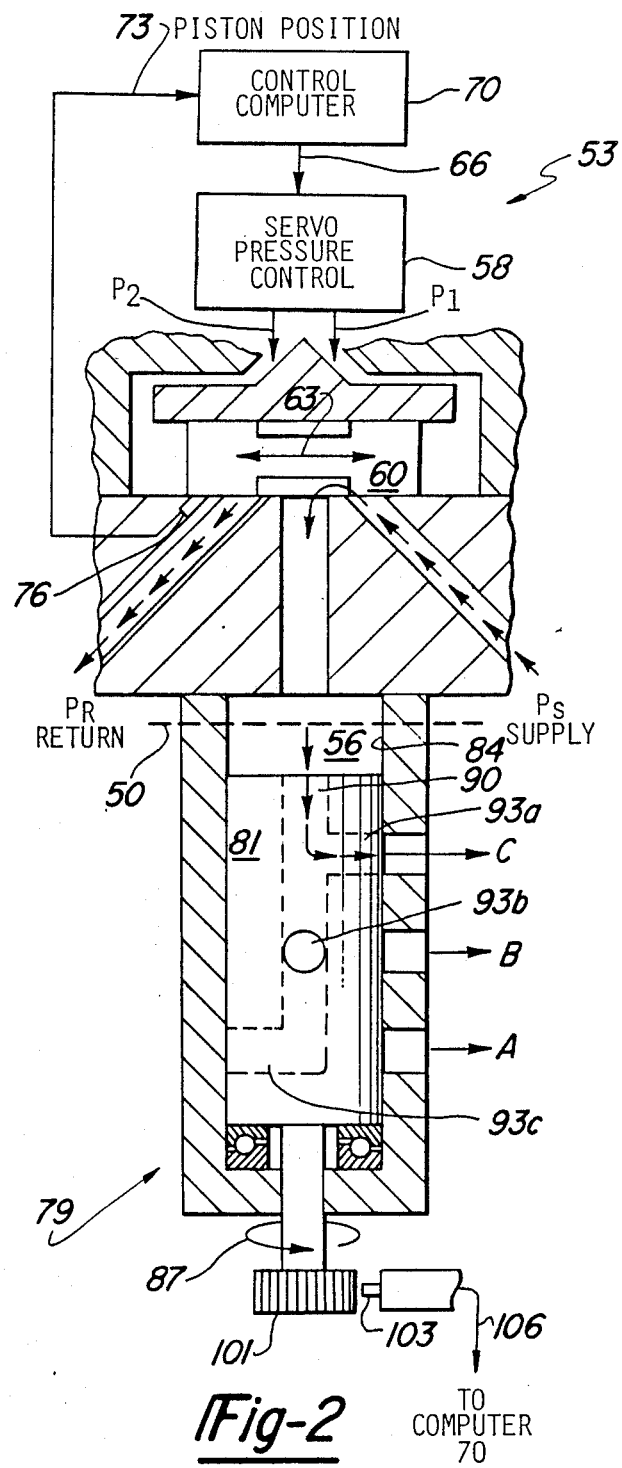
FIG. 2 illustrates one form of the invention.

FIG. 2 illustrates one form of the invention, and can be viewed as comprising two parts, separated by dashed line 50. The upper part 53 contains a control for the pressure in chamber 56, in the lower part. One such control is model number 56-190c available from Moog Corporation located in East Aurora, N.Y. Such controls are generally known as servovalves, and are characterized by the ability to rapidly change (e.g., at a rate of 200 times per second) the pressure in chamber 56.

In order to control the pressure applied to chamber 56, a servovalve 58 controls pressures $P_1$ and $P_2$ which move a piston 60 left and right as indicated by arrows 63 in order to cover and uncover a supply port, $P_s$ and a return port, $P_r$. The pressure applied to the chamber 56 depends upon the amount of port $P_s$ which is uncovered. (Piston 60 does not move to the extent that $P_s$ and $P_r$ mix with either $P_1$ or $P_2$: the hydraulic circuit of $P_1$ and $P_2$ is separate from that of $P_s$ and $P_r$.) For a hydraulic system, typical supply pressures are in the range of 2,000 psi. For pneumatic systems, a typical supply pressure would be 500 psi. $P_r$ connects to a fluid reservoir kept at approximately ambient pressure.

From one point of view, the pressure controller 53 is a high-speed, electrically controlled reducing valve which applies a selected pressure to chamber 56 in response to a signal provided on line 66 from a control computer 70. A feedback signal on line 73, indicative of piston position, as detected by position sensor 76, indicates to the computer 70 the actual pressure applied.

The second part of the apparatus in FIG. 2, namely, the multiplexer 79, will now be discussed. A cylinder or drum 81, also shown in FIG. 4, fits within a cylindrical housing 84, and rotates as indicated by arrow 87. A bore 90 is contained within the cylinder 81, and contains 3 branches, namely, 93a–c. The bore 90 is in constant communication with chamber 56. During rotation, the branches connect with output lines A, B, and C in sequence, the sequence being C, then B, then A in the figure. After each connection is made, the respective branch passes the output line, and the cylinder, using dashed region 97 on the outer surface, in FIG. 4, seals off the respective output line, thereby maintaining the pressure applied within the output line. This sealing occurs because of the tight fit of the cylinder 81 within the housing 84: clearance 100 is less than 1.0 thousandths inch (i.e., 0.001 inch), and preferably of the order of 0.2 to 0.8 thousandths, (i.e. 0.0002 to 0.0008 inch.)

A toothed wheel 101, together with a position sensor 103, both known in the art, indicate to the computer 70 the rotational position of cylinder 81.

A typical sequence of operation of the device in FIG. 2 would be as follows. Assume a pressure of 1,000 psi is to be applied to output line B, and then 500 psi to output line A. First, the computer 70 causes piston 60 to uncover ports $P_s$ and $P_r$ in order to establish a pressure of 1,000 psi in chamber 56. At this time, dashed regions 97 of the cylinder 81 are sealing all output lines A, B, and C. Then, the position sensor 103 provides a signal on line 106 to the computer 70 indicating when branch 93b connects the chamber 56 to output line B. After the connection is terminated, as indicated by position sensor 103, the computer 70 causes the piston 60 to then apply 500 psi to chamber 56, after which second branch 93c connects with output line A, applying 500 psi to output line A. Again, the sensor 103 notifies the computer 70 when the connection to line A is terminated, so that a new pressure can be applied to chamber 56.

The inventors have found that the speed with which the pressure control can change the pressure in chamber 56 limits the speed of operation of the device. In one test, the maximum rate of pressure change was found to be sixty changes per second. It may be desirable to change pressure at a faster rate than this, in which case the embodiment of FIG. 5 can be used, and which is also shown in FIGS. 14 and 15.

In FIG. 5, a spool or drum 110 is contained within a cylinder 112. The spool 110 is shown in perspective view in FIG. 7. The spool 110 contains an annular groove 115 and also a Y-shaped conduit 118. The stem 120 of the Y 118 communicates with the annular groove 115, while the branches of the Y connect to the surface 125 of the spool 110. The annular groove allows the stem 120 of the Y to remain in constant fluid communication with $P_s$ irrespective of rotation of the spool indicated by arrow 128 in FIG. 5. Rotation of the spool 110 is caused by a motor (not shown) which drives a gear 130 which, in turn, drives a second gear 133 which connects to spool 110 by shaft 136. A position sensor 139, analogous to sensor 103 in FIG. 4, responds to the passing of teeth on gear 133, thus providing a signal indicative of the rotational position of spool 110.

Axial motion, indicated by arrows 141, of spool 110 controls the pressure applied to output conduits $P_{head}$ and $P_{rod}$. The axial motion is induced by a jet pipe 143 which directs a fluid jet 146 either into receiver 148 or receiver 150, as determined by the rotational position, indicated by arrows 155, of the jet pipe 143 as induced by solenoid 158. The relative fluid pressures distributed between lines 148 and 150 determine the relative forces upon face 160 and the opposite face 163 of piston 165, thereby determining the axial position attained by piston 165. A position sensor 168 detects the axial position of piston 165 and provides a signal so indicating on line 170. Jet pipes, torque motors, servovalves, and pistons as just described are known in the art. The influence of the axial position of spool 110 upon the pressure in output conduits $P_{rod}$ and $P_{head}$ will now be described.

With the position of spool 110 shown in FIG. 14, lands 173 and 175 of spool 110 block the output lines $P_{rod}$ and $P_{head}$. Lands 173 and 175 are actually the surface 125 in FIG. 7. Output line $P_{rod}$ is connected to the rod chamber 180 of a piston 183 of an actuator, 6a in this case, while output line $P_{head}$ is connected to the head chamber 185. When spool 110 is moved rightward as shown by arrow 184 in FIG. 15, branch 118a of the Y-shaped conduit 118 communicates, to an extent, with line $P_{head}$. Accordingly, fluid under pressure flows, as indicated by arrows 188, into the head chamber 185, driving piston 183 to the left. The leftward motion of piston 183 displaces fluid contained in the rod chamber 180, which returns through rod conduit $P_{rod}$, and empties from cylinder 112 through the return line labeled $P_{R1}$ as indicated by arrows 190.

Similarly, a leftward motion of the spool 110 will cause the other branch 118b of Y-shaped conduit 118 to apply supply pressure $P_s$ to line $P_{rod}$, thereby pressurizing the rod chamber 180, thereby driving piston 183 to the right. Fluid will return through line $P_{head}$, and escape through return conduit $P_{R2}$.

The rotation of spool 110 indicated by arrow 128 in FIG. 5 causes the Y-conduit 118 to shift from the solid position 193 in FIG. 16 to the phantom position 195, thus connecting supply pressure, $P_s$, to a different pair of output conduits, namely, conduits $P_{rod2}$ and $P_{head2}$, in order to actuate a different piston (not shown). That is, in the embodiment shown in FIGS. 5, 14, 15 and 16, spool 110 rotates, as indicated by arrow 128 in FIG. 14, at a constant speed. Position sensor 139 indicates to the control computer (not shown) the rotational position of spool 110, thereby indicating which pair of conduits (e.g., $P_{rod2}$ and $P_{head2}$) in FIG. 16 the Y-conduit 118 is connecting. At the same time, the axial displacement induced by the jet pipe 143 in FIG. 5 controls not only whether supply pressure, $P_s$, is connected to the head chamber 185 in FIG. 14 or the rod chamber 180 of the piston 183, but also the amount of pressure applied. The degree of alignment between arm 118a in FIG. 15 and the head conduit $P_{head}$ determines the total force applied to face 183a of piston 183. The computer coordinates the axial position of the spool 110 with the rotational position, in order to apply the desired force to each piston in the actuators 6A–D in FIG. 1.

As in FIG. 4, surface 125 of spool 110 in FIG. 7 blocks the head and rod conduits $P_{head}$ and $P_{rod}$ in FIG. 15 except when the arms 118a and 118b of the Y conduit are to be connected to the conduits $P_{head}$ and $P_{rod}$.

Figure 11A:
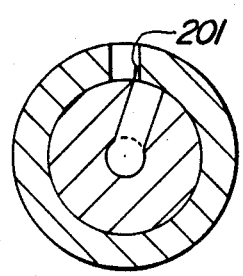
FIGS. 11A–11C illustrate a sequence over which the common cross section 201 of the conduit and outlet changes.
Figure 11B:
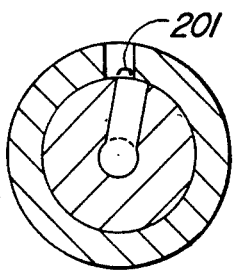
Figure 11C:
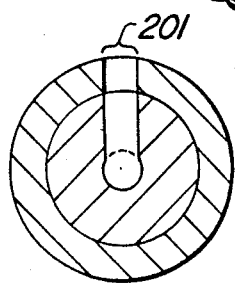

The invention so far described has assumed that the arms of the Y-channel 118 in FIG. 5, the conduits 93a–c in FIG. 4, and the output conduits $P_{head}$ and $P_{rod}$ are circular in cross section. In some circumstances, this can be disadvantageous. For example, as arm 118b in the sequence of FIGS. 11A–11C becomes aligned with conduit $P_{head}$, the common area of intersection 201 of the two circular cross sections will, when plotted as a function of time, appear very generally as shown in FIG. 17. The curve 203 is a type of sinusoid.

Figure 8:
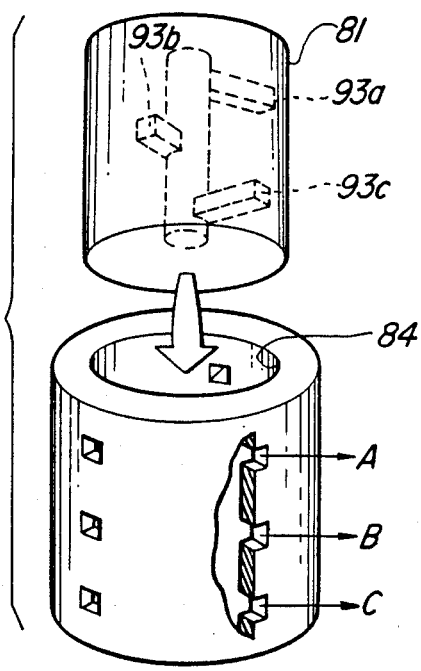
FIG. 8 illustrates alternate cross-sectional shapes of conduits and outlets.

If the respective conduits were made in square cross section, as shown in FIG. 8, then the common cross-section/time plot would become that shown in FIG. 18. In FIG. 18, the length of time T1 to reach a given intersectional area A1 is reduced as compared with a corresponding time T2 in FIG. 17. Restated, it can be desirable to obtain a large intersection as fast as possible, because a small intersection restricts the amount of fluid which can flow through the intersection, thus restricting the amount of energy that can be delivered to the piston 183 in FIG. 14.

Figure 9:
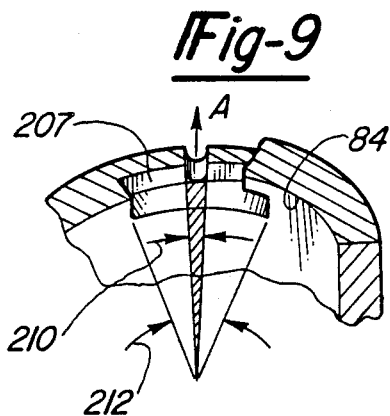
FIGS. 9 and 10 illustrate alternate configurations of conduits and outlets, respectively, which allow an increased time of communication between conduits and outlets.
Figure 10:
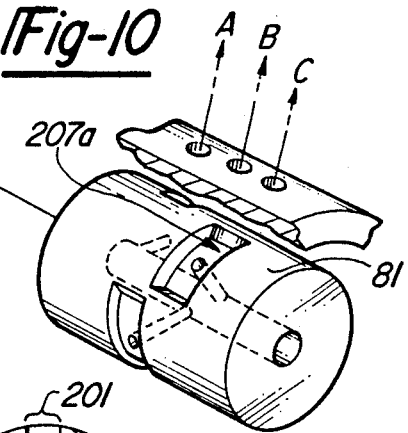

Alternate ways of accomplishing the rapid rise times are shown in FIGS. 9 and 10. In FIG. 9, the cylinder 84 of FIG. 8 contains an arcuate slot 207 which lengthens the angular distance (from distance 210 to distance 212) over which the branch 93a in FIG. 8 connects with the output conduit A in FIG. 9. This lengthening serves to increase the time during which the branch 93a and conduit A are in communication. FIG. 10 shows an arcuate slot 207a contained on the cylinder 81 and which serves a purpose similar to that of the slot 207 in FIG. 9.

Figure 1:
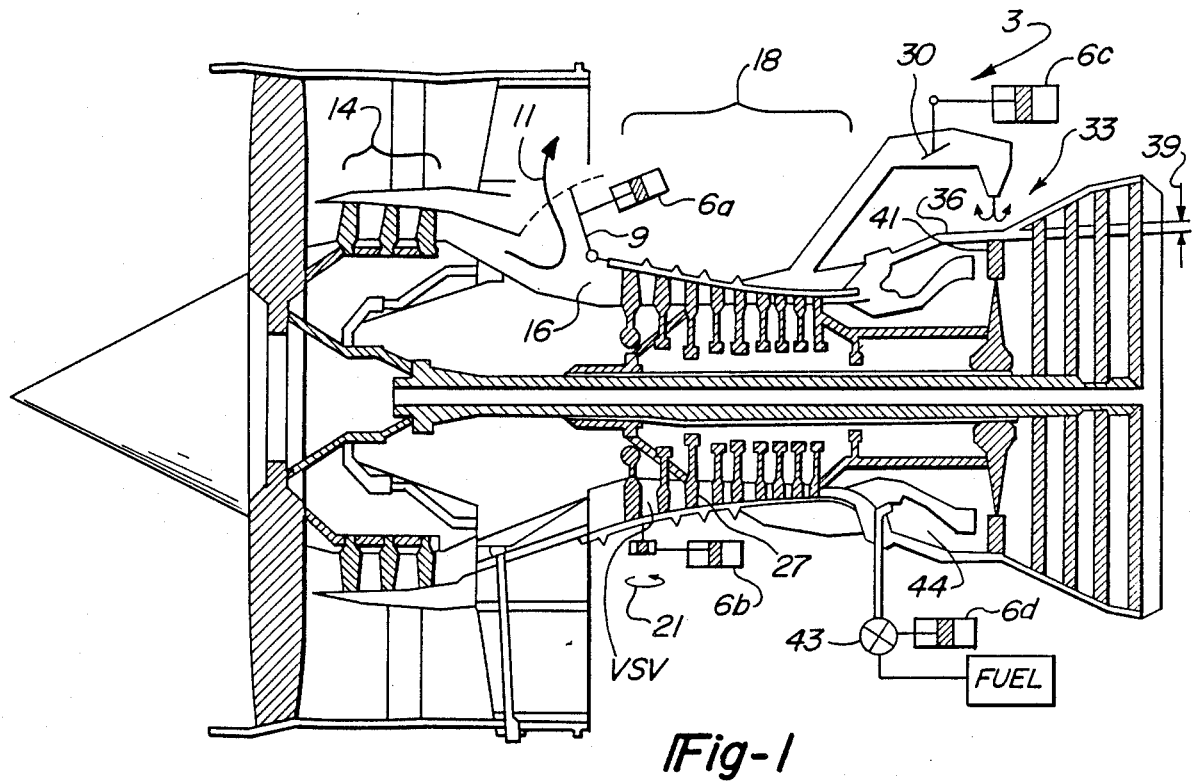
FIG. 1 illustrates a gas turbine engine, together with hydraulic pistons which actuate components of the engine.

The embodiment of FIGS. 14, 15, and 16 can be used in connection with the gas turbine engine of FIG. 1, by connecting the conduit pairs (i.e., $P_{rod}$ and $P_{head}$, $P_{rod2}$ and $P_{head2}$, and $P_{rod3}$ and $P_{head3}$) in FIG. 16 to the pistons 6a–6c shown in FIG. 1, which respectively control the variable by-pass valve, the variable stator vanes, and the clearance control valve. By adding another pair of output conduits to FIG. 16, piston 6d can be controlled, which controls the fuel valve 43. In this manner, a single control, namely, that shown in FIGS. 5, 14, and 15, controls the four hydraulic pistons from a single location, instead of having an individual control associated with each piston at each piston's location.

Several important aspects of the invention are the following:

1. For ease in explanation, the invention has been described in terms of controlling the operation of pistons, such as the piston 6a shown in FIG. 14. However, it should be recognized that any fluidically operated actuator, including rotary hydraulic actuators, can be controlled by the present invention. These actuators (including pistons and rotary hydraulic actuators) can be generically designated as fluidic motors.

2. The successive making and breaking of connections between branch 118a in FIG. 15 and output line $P_{head}$ causes a sequence of pressure pulses to be applied to line $P_{head}$. For example, if the making and breaking occurred at the rate of 60 times per second (because of a rotational speed of 60 rev/sec of spool 110), a 60 hertz signal will be resident in the output conduit $P_{head}$ at all times. An accumulator or muffler, known in the art, can be used to dampen this signal.

Figure 12A:
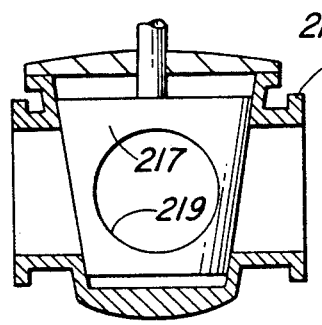
FIGS. 12A and 12B illustrate a plug valve.
Figure 12B:
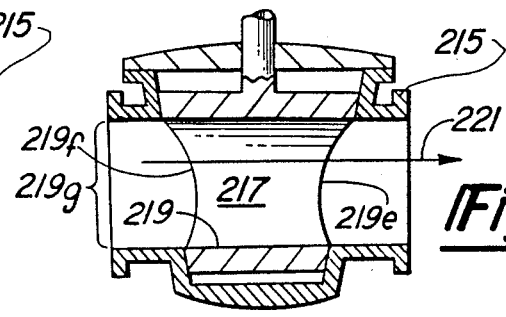

3. The invention can be viewed as a modified plug valve, as FIGS. 12A and 12B will illustrate. In FIG. 12A, a pipe 215 contains a plug 217 having a hole 219 bored therethrough. The entire assembly is referred to as a plug valve. Rotation of the plug into the position shown in FIG. 12B aligns the bore 219 with the pipe 215, thereby allowing flow as indicated by arrow 221.

In FIG. 13, the plug 217 has been modified to make the bore 219a L-shaped. Ends 219b and 219c in FIG. 13 correspond in function to ends 219e and 219f in FIG. 12B, in the respect that one end in each Figure (end 219c in FIG. 13 and end 219f in FIG. 12B) acts as an inlet to the bore 219, while the other ends act as outlets. Bore region 223 is co-axial with the axis of rotation, so that bore region 223 does not move away from an inlet aperture 219g of the valve housing 215 in FIG. 12B, as does end 219f, but region 223 only rotates. Thus, a fluid coupling (not shown) located at a single location (i.e., near end 219c in FIG. 13), and which is analogous in function (i.e., supplying fluid) to annular groove 115 in FIG. 7, can be used to apply fluid pressure to the bore 219 for distribution to the output conduits A–C.

Plug 217 can be viewed as a rotor which rotates within housing 215, which can be viewed as a stator. Similarly, drum 81 in FIG. 1A can be viewed as a rotor, and cylindrical housing 84 can be viewed as a stator.

4. The invention can be viewed as a fluidic multiplexer, wherein a common chamber 56 in FIG. 2 is sequentially connected to several output lines, namely, A, B and C in the case of FIG. 2. It is noted that, in the embodiment discussed above, the sequence of connection was assumed to be constant; that is, the sequence shown in FIG. 2 with the direction of rotation indicated by arrow 87 would be CBA, CBA, and so on. However, an unchanging sequence is not necessary.

5. For example, it can be envisioned that, during rotation of the embodiment shown in FIG. 5, the spool 110 is axially moved by piston 165 into the position shown in FIG. 14 at the time when the Y passes conduits $P_{rod}$ and $P_{head}$, thereby resulting in no connection between the Y conduit 118 and the output conduits. Consequently, in a sense, the sequence has been altered because the pair of output conduits shown receive no fluid pressure during passage of the Y.

6. Even though, with the exception noted in the paragraph above, the order of connections (e.g., ABC, ABC, etc.) made with the output conduits can be viewed as constant, the sequence of pressures applied to the respective conduits is not. The pressure applied to chamber 56 in FIG. 2 will depend upon the pressure needed in the conduit at the time when the respective branches 93a–c connect with conduits A, B, or C. Stated another way, the sequence of connections with the output conduits A, B, and C can be viewed as predetermined, but the sequence of pressures applied is determined as the need arises, as controlled by the computer 70.

7. As stated above, it is the degree of communication between one conduit, in the form of arm 118a, and an output conduit, such as $P_{head}$ in FIG. 15, which determines the force applied to piston 183. The degree of communication depends upon the degree of alignment between the two conduits. In a sense, reduction in the size of the common opening, caused by misalignment, serves to throttle flow through the common opening. Viewed another way, the alignment or degree of misalignment caused by axial motion of spool 110 in FIG. 15 serves a valving function. The size of the opening 250 through which fluid can flow depends upon the axial position of the spool 110.

8. The preceding discussion has considered a multiplexer which supplies four fluidic motors, shown in FIG. 1. However, it should be understood that the number of four is exemplary only, and that larger numbers of motors can be controlled by the invention.

Figure 3:
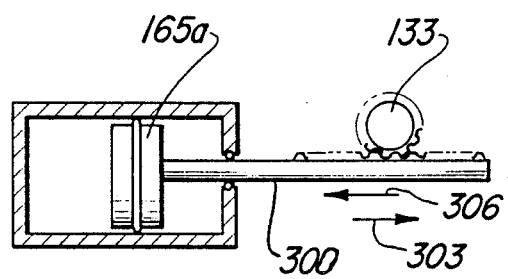

9. The embodiment shown in FIG. 5 obtains rotation of spool 110 by gears 130 and 133. However, in another embodiment, such rotation can be obtained by a piston, similar to piston 165, and controlled by a servovalve, similar to servovalve 158. Such an embodiment is shown in FIG. 3. In that figure, a rack gear 300 is driven in the direction of arrows 303 and 306 by piston 165a. The piston 165a is controlled by a servovalve (not shown) of the type 158 in FIG. 5. The motion of rack 300 in FIG. 3 drives a gear 133, which is the identical gear 133 in FIG. 5. Thus, rack 300 replaces gear 130 in FIG. 5.

10. The signal applied to pressure control 58 in FIG. 2 originates in the control computer 70, which can take the form of a Full Authority Digital Electronic Control (FADEC) as known in the gas turbine engine art. The signals for the three outlets are time-multiplexed on line 66, and are applied sequentially to the pressure control 58. If the sequence of connection with the outlets is CBA, CBA, etc., as indicated by arrow 87, the sequence of pressure signals is Pc, Pb, Pa, followed by Pc, Pb, Pa, and so on. Pc is the signal representing the pressure which is to be applied to chamber 56 when conduit C connects with the chamber 56. Further, the sensor 103 indicates to the computer 70 the time when outlet C connects, thus enabling the computer 70 to provide Pc at the proper time. Similar considerations apply to signals Pb and Pa.

Numerous modifications and substitutions can be undertaken without departing from the true spirit and scope of the invention as defined in the following claims.

We claim:

1. A fluidic multiplexer for controlling a fluidic motor, comprising:
   (a) a cylinder;
   (b) a drum continuously rotatable within the cylinder;
   (c) an annular groove in the drum;
   (d) a conduit connecting between the annular groove and the surface of the drum;
   (e) a plurality of openings in the cylinder, with each of which the conduit periodically communicates for a time interval during rotation of the drum;
   (f) means for applying hydraulic fluid at a selected pressure to the annular groove; and
   (g) means for sealing each opening between periodic communications with the conduit.

2. A multiplexer according to claim 1 and further comprising:
   (h) means for throttling fluid flow through the openings during operation of the rotor by means of axial displacement of the drum.

3. Apparatus according to claim 1 and further comprising a fluidic motor for rotating the drum.

4. A fluidic multiplexer for controlling a fluidic motor, comprising:
   (a) a cylinder;
   (b) a cylindrical drum continuously rotatable within the cylinder;
   (c) an annular groove in the drum;
   (d) a conduit carrying pressurized fluid and connecting between the annular groove and the surface of the drum;
   (e) a plurality of openings in the cylinder, with each of which the conduit periodically communicates for a time interval during rotation of the drum and which the drum seals in the absence of communication;
   (f) means for maintaining fluid pressure in the annular groove; and
   (g) a fluidic motor for rotating the drum and comprising a rack gear driven by a piston, and a pinion gear connected to the drum and driven by the rack.

* * * * *